Oct. 15, 1935.   J. H. MEAGHER   2,017,668
TEMPERATURE RELIEF VALVE
Original Filed April 12, 1933
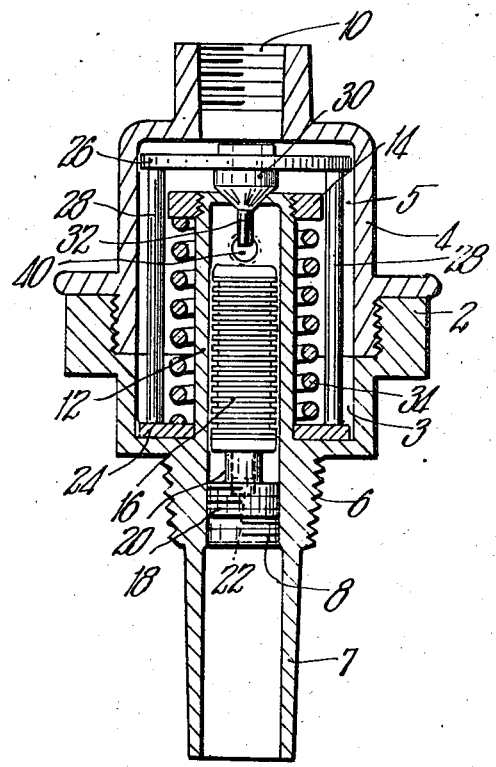
INVENTOR.
James H. Meagher
BY Carter C. Ross
ATTORNEY.

Patented Oct. 15, 1935

2,017,668

UNITED STATES PATENT OFFICE 2,017,668

TEMPERATURE RELIEF VALVE

James H. Meagher, Springfield, Mass., assignor to The Chapman Valve Manufacturing Company, Indian Orchard, Mass., a corporation of Massachusetts Application April 12, 1933, Serial No. 665,812
Renewed March 23, 1935

8 Claims. (Cl. 122—504)

This invention relates to improvements in temperature relief valves and is directed more particularly to valves adapted for use in connection with domestic hot water systems, heating systems and the like.

The principal objects of the invention are directed to the provision of a temperature relief valve which is adapted and arranged to open when the temperature in the system with which the valve is used reaches a certain point and thereby relieves the system of excessive temperature. When the temperature has been restored to the desired normal, the valve again closes. According to a special feature of the invention, supplemental venting means is provided which is operable under certain conditions of temperature, which together with the first-mentioned venting means insures that the system may be vented at certain desired temperatures and also at a pre-determined high temperature.

Various novel features and advantages of the invention will be more fully hereinafter referred to in connection with the accompanying description of the preferred form thereof, reference being made to the accompanying drawing wherein:

The figure is a sectional elevational view through a valve showing the novel features of the invention.

Referring now to the drawing more in detail the invention will be fully described.

The valve of this invention preferably includes a body 2 and a cap 4 in screw threaded engagement therewith to provide a casing. A threaded hub 6 at the lower end of the body is for screwing into some part of a system such as a hot water supply tank and is provided with an inlet 8 which is threaded as shown.

A quill extends from the threaded hub so that when the valve is screwed into a unit such as a tank, the quill will extend beyond the connection. This permits corrosion from filling up the opening into the valve which often occurs at the threaded connection.

The cap 4 on its upper side is bored at 10 to provide an outlet, or waste discharge port, which bore is threaded, as shown, for receiving a pipe or connection, whereby the valve, when opened for venting a system, will deliver water to waste through a pipe connected at 10.

The body 2 has a chamber 3 therein as shown and the cap 4 has a similar chamber 5, so that when the cap 4 and body 2 are secured together there is provided a closed chamber. A tube-like part 12 extends upwardly within the chamber and a nut 14 is in threaded engagement with the upper end thereof, as shown.

A thermostat 16 which may be of the sylphon type, as shown, is located within the bore of the tube 12. An adjusting plug 18 is in threaded engagement with the threaded opening 8 of the body so as to be movable up and down therein. This plug 18 has a hub 20 which is bored out to receive a pilot 22 on the lower end of the sylphon. The sylphon or thermostat is of the well known form and is adapted to expand or elongate longitudinally under the influence of heat. The plug 18 is adjustable so as to move the thermostat up and down and position its upper end as may be desired with reference to a valve 30 to be later described.

A cage is provided within the bore of the cap and body and consists of a lower flange 24 and an upper flange 26 which are tied together with a plurality of tie rods 28 or other suitable means. The lower member 24 is movable on the tube 12. The upper member 26 has a valve 30 associated therewith which has a depending spur 32 disposed over the sylphon.

A spring 34 is disposed around the tube 12 of the base and between the nut 14 and lower flange 24. Normally this spring exerts pressure on the lower flange 24 to hold the cage in a lower position with the valve 30 seated on a valve seat provided at the upper end of the tube 12. The parts are arranged so that as the thermostat is expanded or elongated under the influence of heat its upper end will engage the spur 32 of the valve 30 and act on the valve to elevate the cage against the pressure of the spring. In this way, the valve 30 is moved upwardly and away from its seat and water may flow upwardly through the tubular member 12, past valve 30, and through the waste connection. By moving the member 18 up and down the upper end of the sylphon is adjusted relative to the valve so that the sylphon will act to open the valve under various temperatures.

The nut 14 may be screwed up and down for varying the tension of the spring, and thereby the resistance is variable. The sylphon is preferably a sliding fit within the bore of the tubular portion 12. This is desirable in order that the sylphon may elongate freely within the bore and allow water to pass thereby. Yet it is also desired that the bore act as a guide for the sylphon to prevent it buckling appreciably when it is expanded or elongated into engagement with the valve 30 and overcomes the spring. By eliminating the tendency to bind or buckle the accuracy of operation is enhanced.

As additional venting means a fusible plug represented by 40 is associated with the tube 12. This plug 40 may be of so-called fusible metal which will melt at some pre-determined temperature and it may be located in a wall of the tubular portion as shown. The plug will preferably be adapted to melt at a temperature which is slightly higher than the maximum temperature at which the valve will operate. In this way, should the temperature in the system reach an abnormal high temperature and for some reason should the sylphon fail to act quickly enough, the fusible plug will be melted so that the valve is vented even without the opening of the valve 30. It is intended that the system will be vented by action of the thermostat at some pre-determined temperature but, as a safeguard, the fusible plug will act to vent the system at some higher temperature in case of the failure of the sylphon to do so.

The combination of the temperature-operated valve 30 and the fusible plug 40 is not only desired but, in many instances, required by municipal regulations, all to the end that a hot water system may be vented and the dangers incident to excessive temperatures in the system obviated.

Various changes and modifications may be made in the form of the invention without departing from the spirit and scope thereof and therefore what I desire to claim and secure by Letters Patent of the United States is:

1. A valve of the class described comprising in combination, a body and cap having inlet and outlet openings, a tube extending upwardly from the body in communication with the inlet thereof having a valve seat in its upper side, a valve engageable with said seat, spring means associated with said tube normally holding said valve on said seat and a thermostat in said tube operable to engage said valve to move it from said seat.

2. A valve of the class described comprising in combination, a body and cap hollowed out to form a chamber, an outlet and an inlet associated with said cap and body, a tube extending into said chamber from said body having an outlet port and a valve seat on its upper end, a valve engageable with said seat, spring mechanism in said chamber acting on said valve and a thermostat in said tube adapted to engage said valve for moving it from its seat.

3. A valve of the class described comprising in combination, a body and cap hollowed out to form a chamber, an outlet and an inlet associated with said cap and body, a tube extending into said chamber from said body having an outlet port and a valve seat on its upper end, a valve engageable with said seat, spring mechanism in said chamber acting on said valve and a thermostat in said tube adapted to engage said valve for moving it from its seat, the said spring mechanism including connected lower and upper members the latter of which is associated with said valve, a nut on said tube and a spring interposed between said nut and said lower member.

4. A valve of the class described comprising in combination, a body and cap hollowed out to form a chamber and outlet and inlet openings associated with said body and cap, a tube extending from said body into said chamber provided with a seat at its upper end, a lower member slidable relative to said tube connected to an upper member, a valve associated with said upper member for engaging said seat, a spring between said lower member and a part on said tube, and a temperature sensitive element in said tube adjustable towards and away from said valve to operate the same.

5. A valve of the class described comprising in combination, a casing having inlet and outlet openings, a tube extending upwardly in said casing in communication with the inlet thereof having a valve seat in its upper side, a valve engageable with said seat, spring means associated with said tube normally holding said valve on said seat and a thermostat in said tube operable to engage said valve and move it from said seat.

6. A valve of the class described comprising in combination, a casing having a chamber provided with inlet and outlet openings, a tube extending upwardly into said chamber in communication with said inlet and having a valve seat in its upper side, a valve member engageable with said seat spring means in said chamber acting on said valve, a thermostat in said tube operable to engage said valve and move it from said seat at certain excessive temperatures, and a fusible plug associated with said tube adapted to melt and vent the valve at temperatures greater than said certain excessive temperatures.

7. A valve of the class described comprising in combination, a casing hollowed out to form a chamber and having outlet and inlet openings, a tube extending upwardly into said chamber having an outlet port and a valve seat on its upper end, a valve engageable with said seat, spring mechanism in said chamber acting on said valve, the said spring mechanism including connected lower and upper members and a flange member on said tube and a spring interposed between said flange member and said lower member, the said upper member being associated with said valve and a thermostat in said tube adapted to engage said valve for moving it from its seat.

8. A valve of the class described comprising in combination, a casing hollowed out to form a chamber and having outlet and inlet openings, a tube extending upwardly into said chamber provided with a seat at its upper end, a lower member in said casing slidable relative to said tube and connected to an upper member, a valve associated with said upper member for engaging said seat, a spring disposed between said lower member and a part on said tube, and a temperature-sensitive element in said tube adjustable towards and away from said valve to operate the same.

JAMES H. MEAGHER.